(12) United States Patent
Skillin

(10) Patent No.: US 9,555,426 B2
(45) Date of Patent: Jan. 31, 2017

(54) MEASURED DOSE DISPENSERS AND METHODS OF USING THE SAME

(71) Applicant: MWV Slatersville, LLC, Slatersville, RI (US)

(72) Inventor: Clifford W. Skillin, Blackstone, MA (US)

(73) Assignee: WESTROCK SLATERSVILLE, LLC, Norcross, GA (US)

( * ) Notice: Subject to any disclaimer, the term of this patent is extended or adjusted under 35 U.S.C. 154(b) by 23 days.

(21) Appl. No.: 14/754,252

(22) Filed: Jun. 29, 2015

(65) Prior Publication Data

US 2016/0375452 A1    Dec. 29, 2016

(51) Int. Cl.
| | |
|---|---|
| B65D 37/00 | (2006.01) |
| B05B 11/04 | (2006.01) |
| B05B 11/00 | (2006.01) |
| B65D 47/08 | (2006.01) |
| B65D 47/20 | (2006.01) |

(52) U.S. Cl.
CPC .......... B05B 11/047 (2013.01); B05B 11/0064 (2013.01); B05B 11/0072 (2013.01); B65D 47/0838 (2013.01); B65D 47/2068 (2013.01)

(58) Field of Classification Search
CPC ............... B08B 11/047; B08B 11/0072; B08B 11/0064; B67D 47/0838; B67D 47/2068
USPC .......... 222/207, 212–215, 491–497, 477, 92, 222/106, 107
See application file for complete search history.

(56) References Cited

U.S. PATENT DOCUMENTS

| | | | |
|---|---|---|---|
| 3,091,374 A * | 5/1963 | Schwartzman | G01F 11/263 222/448 |
| 4,811,871 A | 3/1989 | Wass et al. | |
| 4,946,080 A * | 8/1990 | Vesborg | G01F 11/263 222/212 |
| 5,341,718 A | 8/1994 | Woodall, Jr. et al. | |
| 8,366,681 B2 * | 2/2013 | Carpenter | A61M 3/0262 222/213 |
| 8,851,333 B2 * | 10/2014 | van de Poll | B05B 11/0072 222/207 |
| 2010/0006601 A1 | 1/2010 | De Man et al. | |
| 2011/0089191 A1 * | 4/2011 | Altonen | G01F 11/288 222/1 |
| 2011/0198371 A1 | 8/2011 | Law et al. | |

(Continued)

FOREIGN PATENT DOCUMENTS

| | | |
|---|---|---|
| WO | 2005049477 A2 | 6/2005 |
| WO | 2012171708 A1 | 12/2012 |

*Primary Examiner* — Lien Ngo
(74) *Attorney, Agent, or Firm* — Barlow, Josephs & Holmes, Ltd.

(57) ABSTRACT

A dispensing closure for dispensing a flowable product from a squeeze-type product container includes a closure body having an upper deck, an exit orifice, a flow conduit providing a flow path to the exit orifice, and a skirt configured to attach to a product container. A measuring reservoir is received in engagement with a lower surface of the upper deck. The measuring reservoir is filled with a measured dose of flowable product through flow ports when the container is inverted. A piston valve is slidably movable within the measuring reservoir between an open position and a closed position. The piston valve is movable from the open position to the closed position to dispense the measured dose of product responsive to pressure within the container induced by squeezing normally biases the piston valve to the open position.

12 Claims, 10 Drawing Sheets

(56) References Cited

U.S. PATENT DOCUMENTS

| | | |
|---|---|---|
| 2012/0097714 A1 | 4/2012 | Hoefte et al. |
| 2013/0270301 A1 | 10/2013 | Schoubben et al. |
| 2014/0008398 A1 | 1/2014 | Law et al. |
| 2014/0231462 A1 | 8/2014 | Ray et al. |

\* cited by examiner

MEASURED DOSE DISPENSERS AND METHODS OF USING THE SAME

BACKGROUND OF THE INVENTION (1) Field of the Invention

The instant invention relates to dispensing closures for containers for flowable products such as personal care products, concentrated beverages, food products, home and garden chemical products, healthcare products, etc. More specifically, the invention relates to a dispensing closure having an interior measuring reservoir which is automatically filled with a measured dose of the flowable product when the container is inverted, and dispenses the measured dose of product from the measuring reservoir when the container is squeezed.

(2) Description of Related Art

Dispensing containers are used in a variety of industries for dispensing various liquid or flowable products. As integrated dispensing closures become more prevalent in all industries consumer desire presses for their use on an ever expanding array of products and packages, while product manufacturers search for unique solutions at the lowest possible cost to promote sales and maintain profit margins.

SUMMARY OF THE INVENTION

The instant invention is directed to a 4-piece dispensing closure for dispensing a measured dose of a flowable product from a squeeze-type product container. Generally, the product container is molded from a flexible plastic and is sufficiently pliable such that the user may readily squeeze the container to apply pressure to the flowable product contained therein.

The dispensing closure comprises a closure body, a closure lid connected to the closure body by a living hinge, a measuring reservoir, a piston valve movable within the measuring reservoir, and a spring for biasing the piston valve.

The closure body has an upper deck, a centrally located exit orifice, and a flow conduit in communication with the exit orifice which depends downwardly from the upper deck to provide a flow path from an entrance orifice at a lower end thereof to the exit orifice. The closure body further includes an inner mounting skirt depending downwardly from the upper deck and an outer decorative skirt shaped to blend with the outside shape of the product container. The inner skirt includes threads for engagement with a threaded neck of the product container.

The cup-shaped measuring reservoir has a bottom wall, a cylindrical sidewall extending up from the bottom wall, and an upper peripheral edge received in snap-fitting engagement with a mounting rim on a lower surface of the upper deck. The mounting rim encircles the flow conduit such that the measuring reservoir surrounds the flow conduit. The measuring reservoir has a plurality of flow ports adjacent to the upper peripheral edge to allow the flowable product into the measuring reservoir. In use, the measuring reservoir fills with a measured dose of flowable product through the flow ports when the container is inverted. The bottom wall also includes a plurality of pressure apertures through which product moves during dispensing and refilling.

The cup-shaped piston valve has a bottom wall and a valve stem extending upwardly from the bottom wall, the piston valve being slidably movable within the measuring reservoir between an open position and a closed position. In the open position, the valve stem is spaced from a valve seat formed at an entrance orifice of the flow conduit whereby flowable product can enter the measuring reservoir through the flow ports and exit through the flow conduit. In the closed position, the valve seat is in mating engagement with the valve seat closing the flow conduit and preventing the flowable product from exiting the exit orifice.

A coil spring resides within the measuring reservoir where it encircles the flow conduit and the valve stem and is captured between the lower surface of the upper deck and the bottom wall of the piston valve. The spring normally biases the piston valve to its open resting position.

In operation, the piston valve remains in the open at rest position. To fill the measuring reservoir with a measured dose of flowable product, the container is inverted where the flowable product enters and fills the measuring reservoir through the flow ports adjacent the lower surface of the upper deck. The product within the measuring reservoir is now ready for dispensing. Dispensing of the measured dose is accomplished by squeezing the container to product produce pressure within the container. Continuous pressure within the container forces flowable product through the pressure ports into the measuring reservoir beneath the bottom wall of the piston valve, and forces the piston valve to move from the open position towards the closed position and in doing so to dispense the measured dose of product through the flow conduit and out the exit orifice. When the piston valve reached the closed position, the valve stem engages the valve seat on the bottom end of the flow conduit to close the conduit and complete the dispensing cycle.

The release of pressure from the container allows the coil spring to expand and force the piston valve back to the normal at rest position. The reverse motion of the piston valve creates a suck-back effect at the exit orifice preventing any product from dripping from the exit orifice once the squeezing pressure is released.

The amount of the measured dose can be adjusted by varying the size of the measuring reservoir, the size of the flow ports and the size of the pressure apertures.

BRIEF DESCRIPTION OF THE DRAWINGS

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

DETAILED DESCRIPTION OF THE INVENTION

Figure 1:
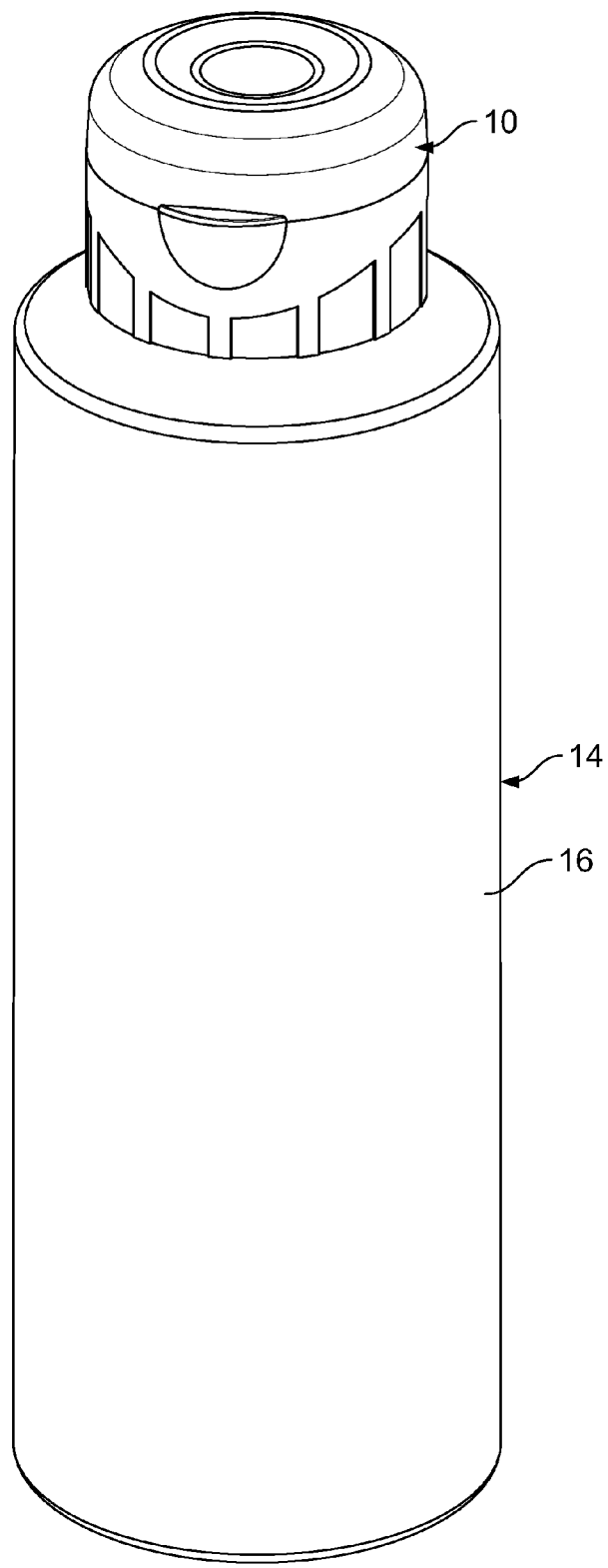
FIG. 1 is a perspective view of an exemplary embodiment of the dispensing closure mounted on a squeeze-type product container.
Figure 2:
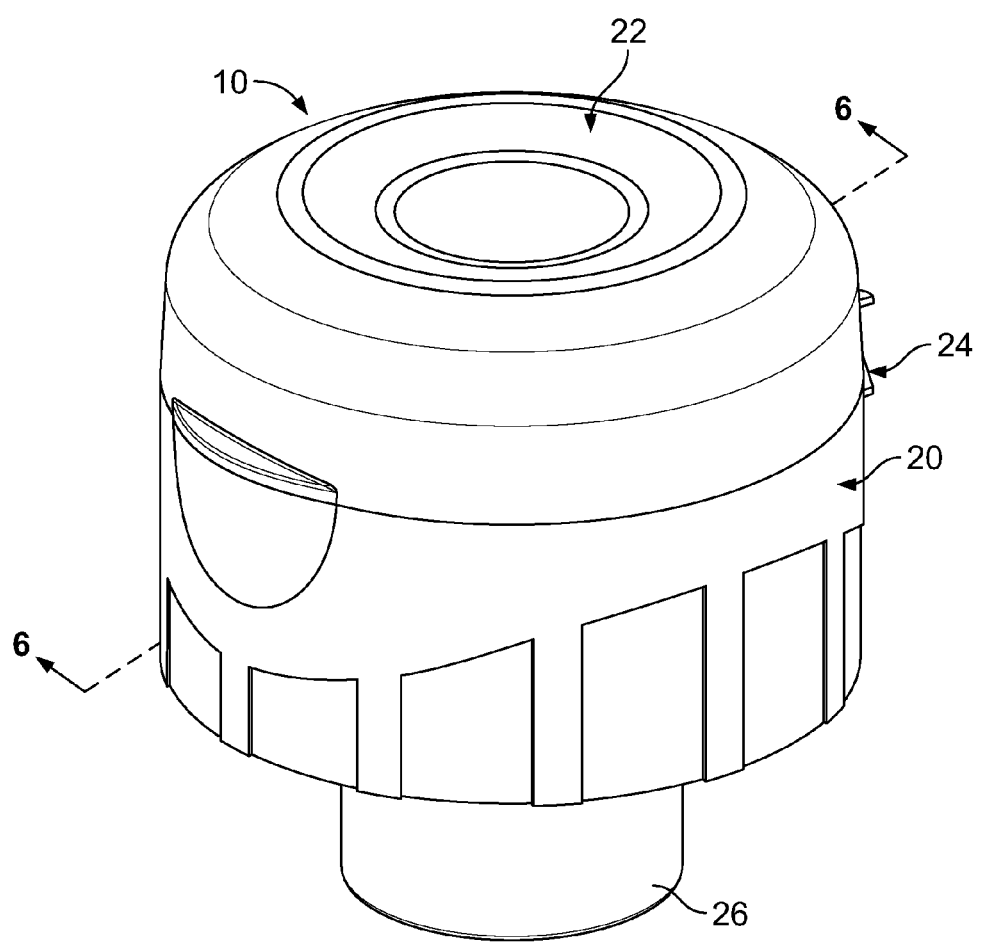
FIG. 2 is a top perspective view of the dispensing closure.
Figure 3:
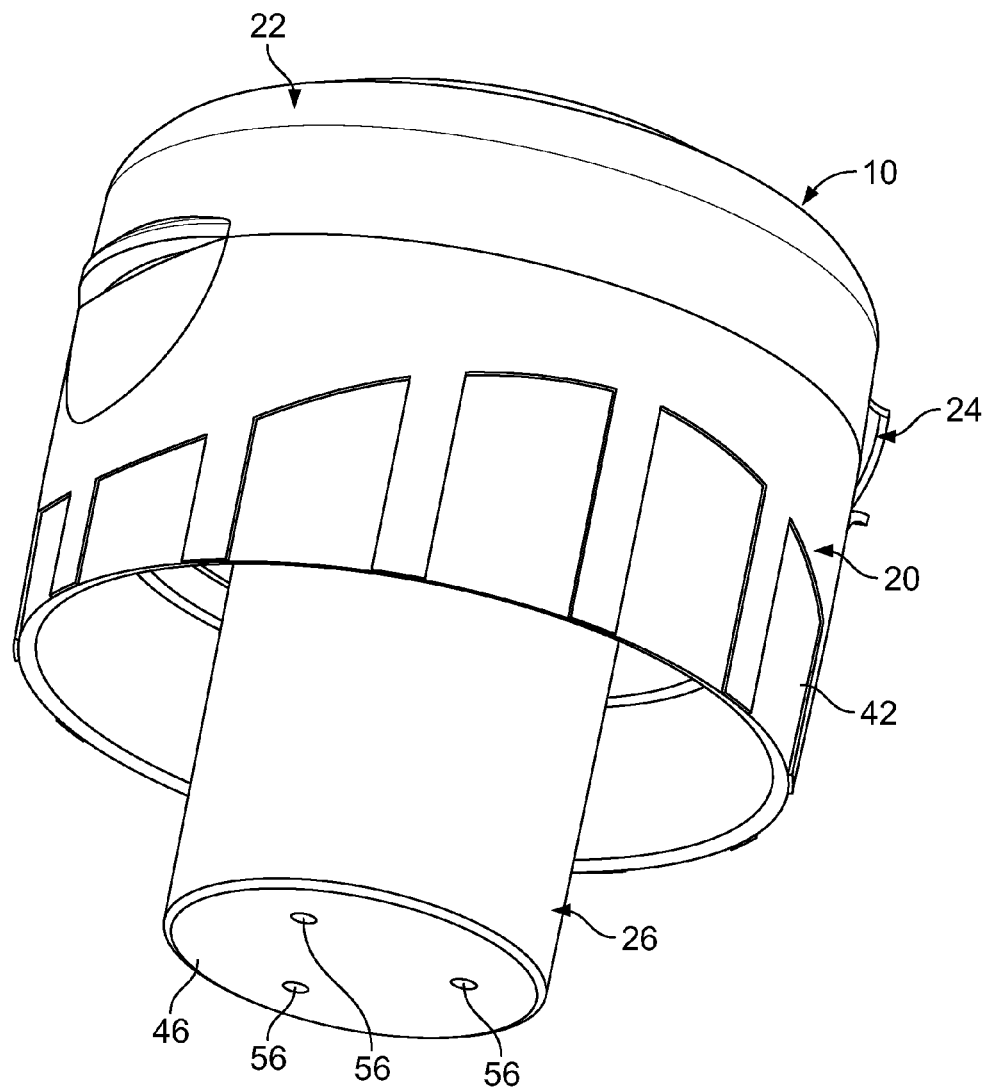
FIG. 3 bottom perspective view thereof.

Referring now to the drawings, an exemplary embodiment of the invention is generally indicated at 10 in FIGS. 1-10.

The instant invention is directed to a 4-piece dispensing closure 10 for dispensing a measured dose of a flowable product 12 from a squeeze-type product container 14.

Generally, the product container 14 is molded from a flexible plastic and has a main body portion 16 which is sufficiently pliable such that the user may readily squeeze the container 14 to apply pressure to the flowable product 12 contained therein. Preferably, the container 14 also may include a threaded neck 18

The dispensing closure 10 comprises a closure body 20, a closure lid 22 connected to the closure body 20 by a living hinge 24, a measuring reservoir 26, a piston valve 28 movable within the measuring reservoir 26, and a spring 30 for biasing the piston valve 28 to a normally open position. The dispensing closure 10, closure lid 22, measuring reservoir 26 and piston valve 28 are preferably molded from plastic, while the spring 30 is preferably stainless steel. Other materials as suitable for the flowable product are also contemplated.

The closure body 20 has an upper deck 32, a centrally located exit orifice 34, and a flow conduit 36 in fluid communication with the exit orifice 34. The flow conduit 36 depends downwardly from the upper deck 32 to provide a flow path from an entrance orifice 38 at a lower end thereof upwardly to the exit orifice 34. The closure body 20 further includes an inner mounting skirt 40 depending downwardly from the upper deck 32 and an outer decorative skirt 42 shaped to blend with the outside shape of the product container 14. The inner skirt 40 includes threads for engagement with the threaded neck 18 of the product container 14.

Figure 4:
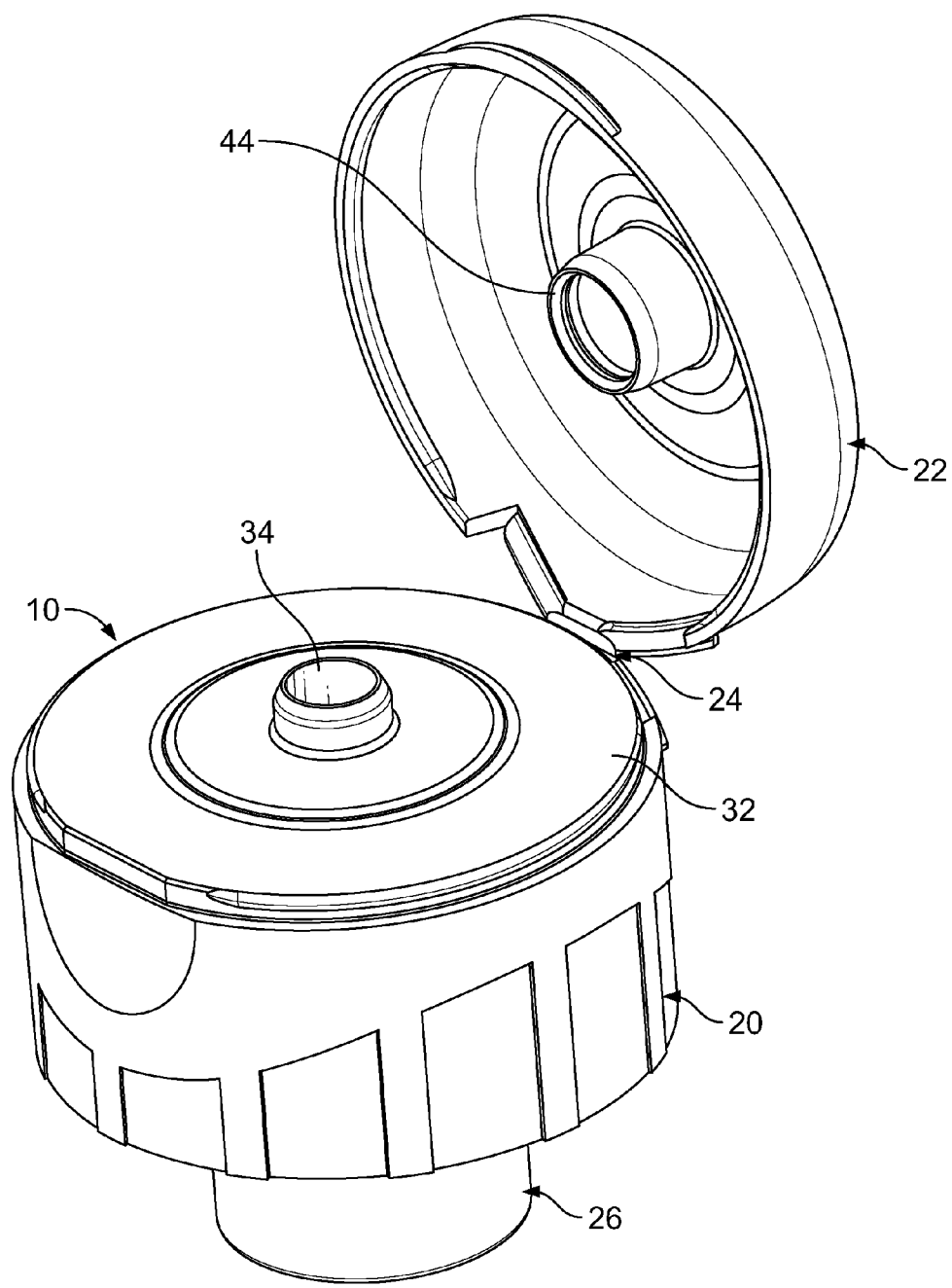
FIG. 4 is another perspective view thereof with the closure lid open.
Figure 6:
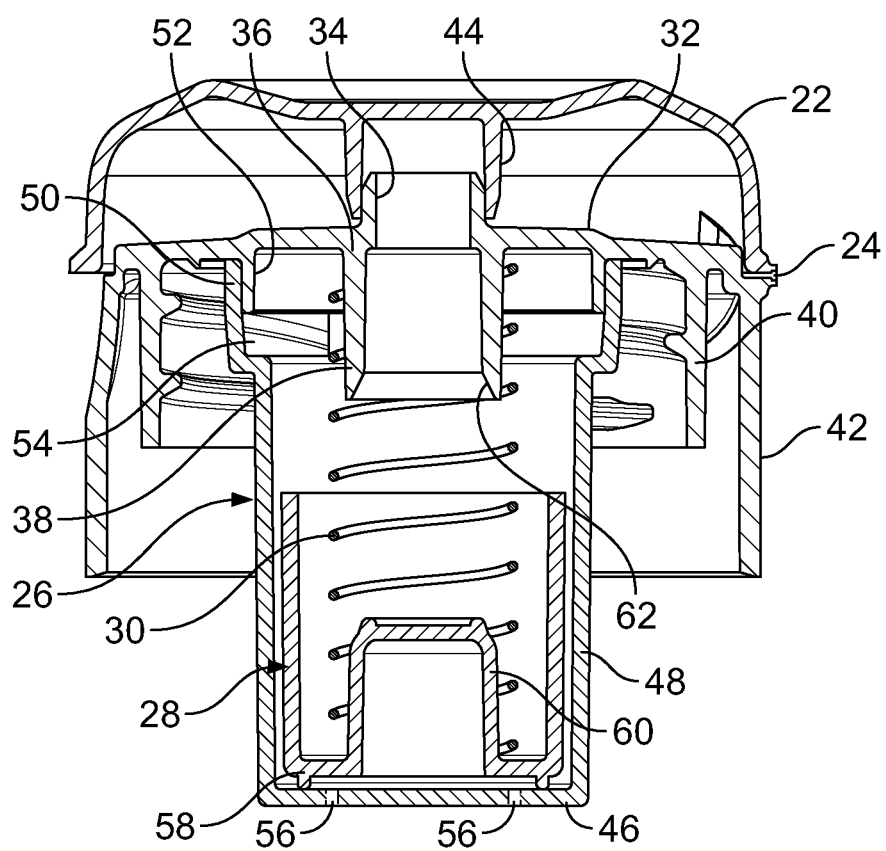
FIG. 6 is a cross-sectional view thereof taken along line 6-6 of FIG. 2.

The closure lid 22 is movable between a closed position (FIGS. 1-3) and an open position (FIGS. 4 and 6). The lid 22 includes a sealing structure 44 on the underside of the top wall which is received in interfitting engagement with the exit orifice 34 to selectively prevent flowable product from exiting the exit orifice 34 when the lid 22 is closed (See FIG. 6).

Figure 5:
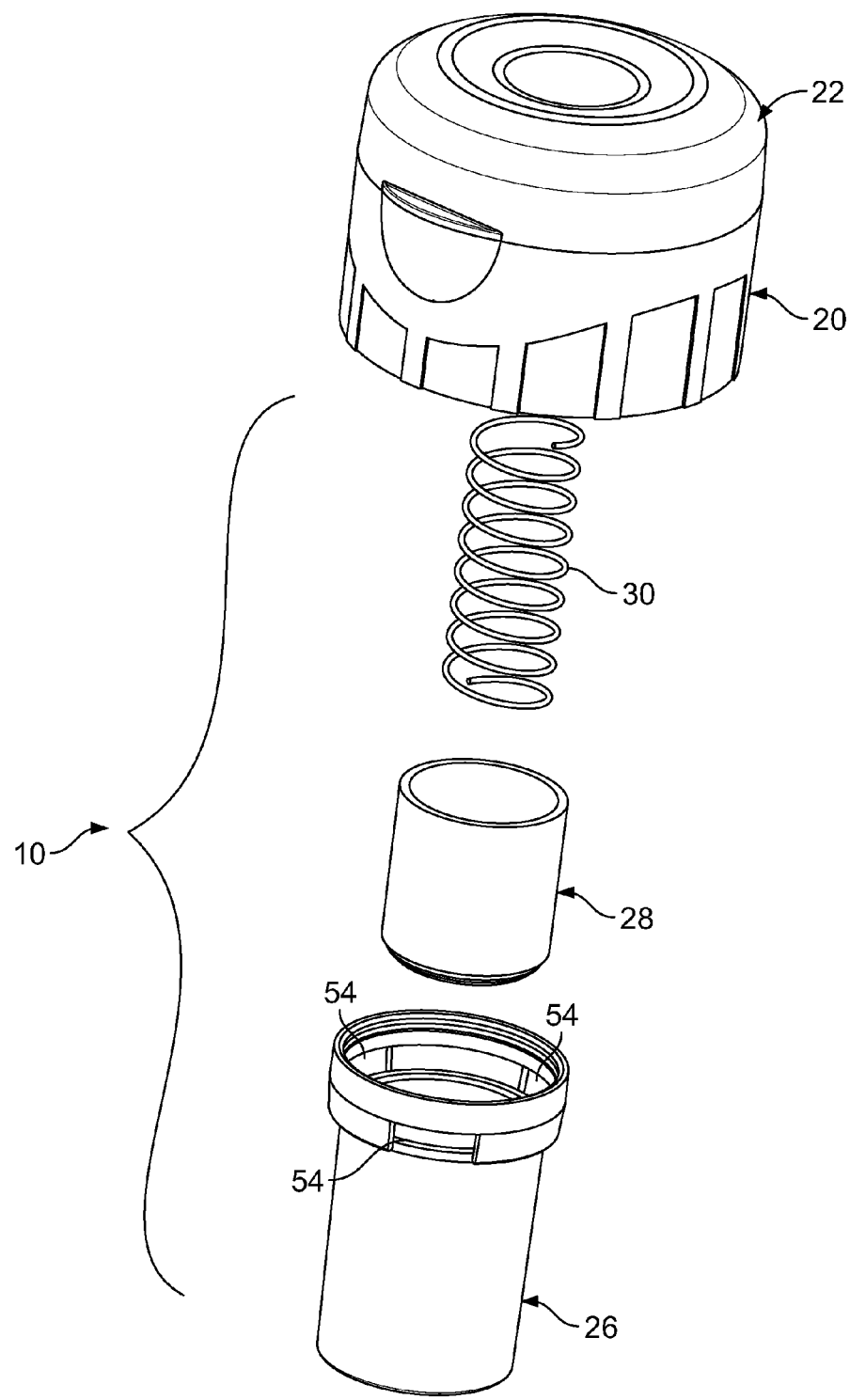
FIG. 5 is an exploded perspective view showing the components of the exemplary dispensing closure.

Referring to FIGS. 5 and 6, the cup-shaped measuring reservoir 26 has a bottom wall 46, a cylindrical sidewall 48 extending up from the bottom wall 46, and an upper peripheral edge 50 received in snap-fitting engagement with a concentric, annular mounting rim 52 on a lower surface of the upper deck 32. The mounting rim 52 encircles the flow conduit 36 such that the measuring reservoir 26 encircles and surrounds the flow conduit 36. The measuring reservoir 26 has a plurality of flow ports 54 (best seen in FIG. 5) adjacent to the upper peripheral edge to allow the flowable product into and out of the measuring reservoir 26. In use, the measuring reservoir 26 fills with a measured dose of flowable product through the flow ports 54 when the container 14 is inverted. The bottom wall 46 also includes a plurality of pressure apertures 56 through which product moves during dispensing and refilling.

Figure 7:
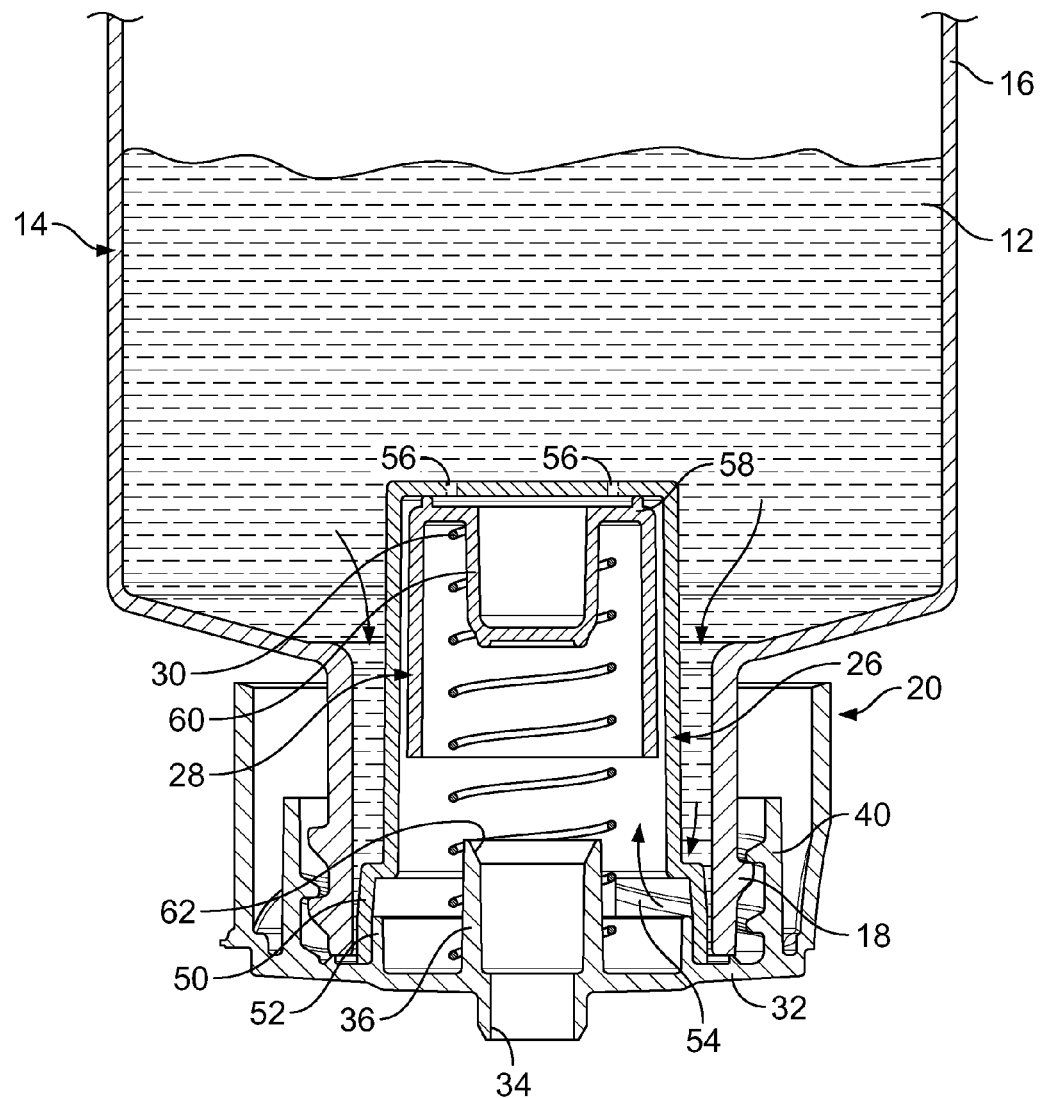
FIG. 7 is a cross-section view showing the dispensing closure inverted and the piston valve an at-rest open position.
Figure 8:
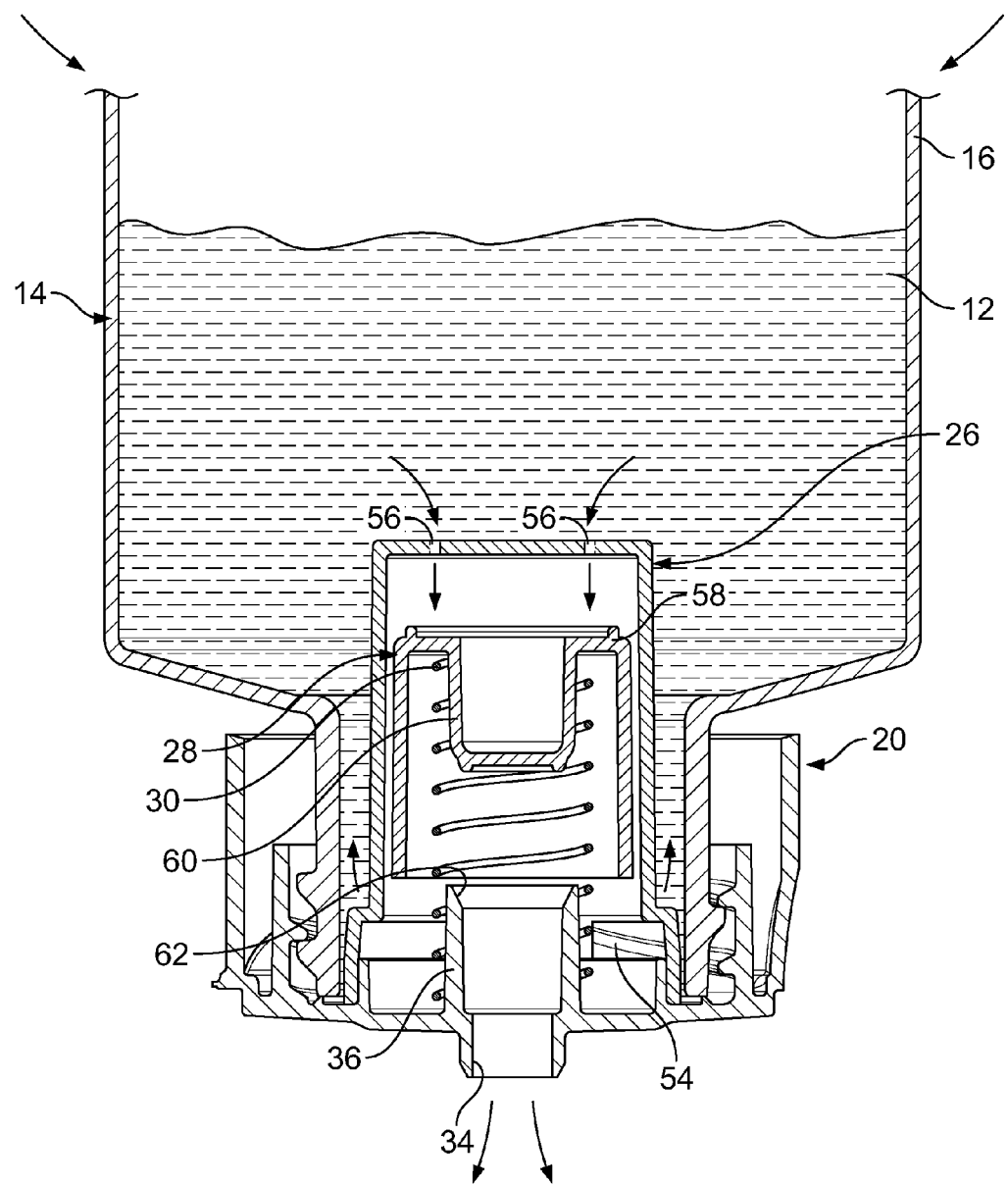
FIG. 8 is another view thereof with the container being squeezed to dispense the product.
Figure 9:
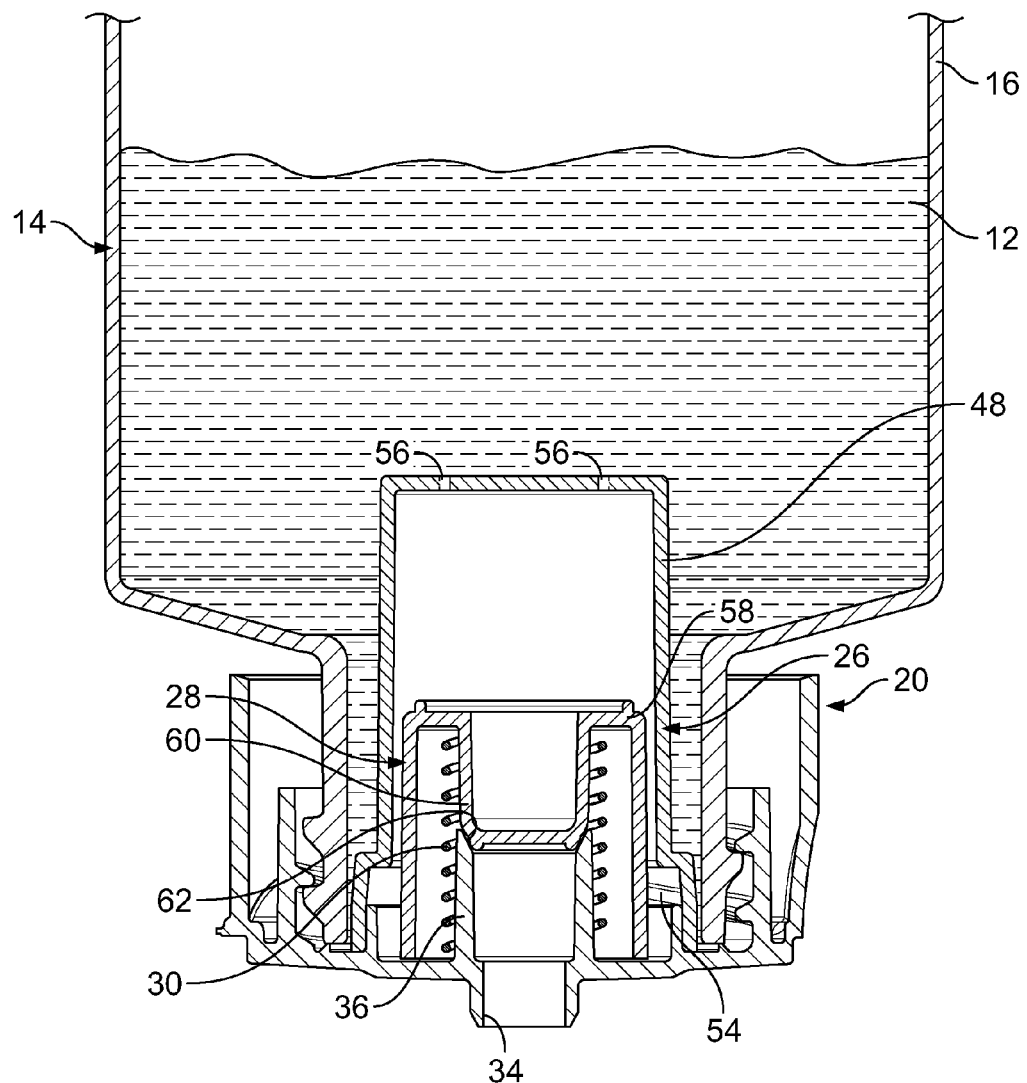
FIG. 9 is still another view thereof with the piston valve fully closed at the end of the dispensing stroke.
Figure 10:
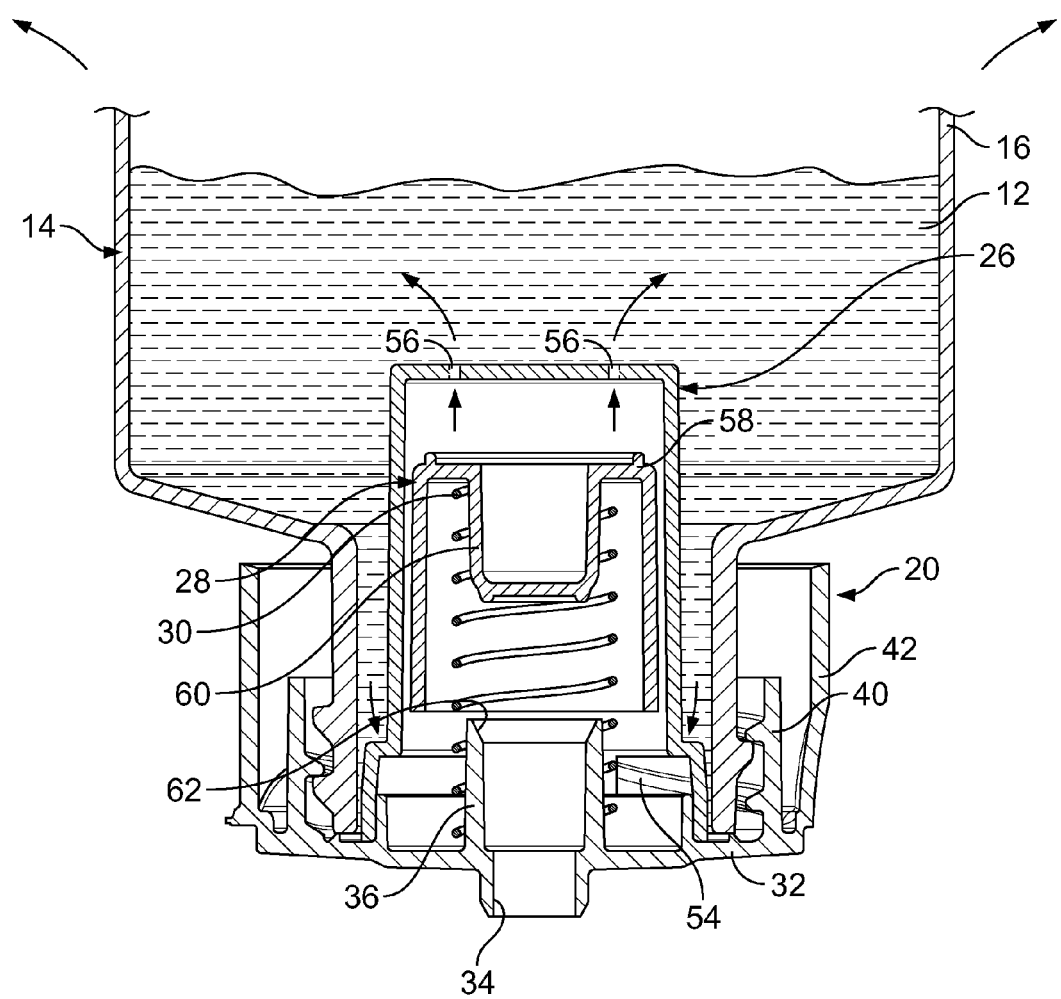
FIG. 10 is yet another view thereof of the piston valve being returned to the open position after releasing pressure on the container.

Referring to FIGS. 5-10, the cup-shaped piston valve 28 has a bottom wall and a valve stem 60 extending upwardly from the bottom wall 58, the piston valve 28 being slidably movable within the measuring reservoir 26 between an open position (FIGS. 6-7) and a closed position (FIG. 9). The closure lid 22 is omitted from FIGS. 7-10 for clarity. In the open position (FIG. 7), the valve stem 60 is spaced from a valve seat 62 formed at an entrance orifice 38 of the flow conduit 36 whereby flowable product 12 can enter the measuring reservoir 26 through the flow ports 54 and exit through the flow conduit 36 (see arrows). In the closed position (FIG. 9), the valve stem 60 is in mating engagement with the valve seat 62 closing the flow conduit 36 and preventing the flowable product 12 from exiting the exit orifice 34.

The coil spring 30 resides within the measuring reservoir 26 where it encircles the flow conduit 36 and the valve stem 60 and is captured between the lower surface of the upper deck 32 and the bottom wall 58 of the piston valve 28. The spring 30 normally biases the piston valve 28 to its open resting position (FIG. 7).

In operation, the piston valve 28 begins its cycle in the open at rest position (FIG. 6). To fill the measuring reservoir 26 with a measured dose of flowable product 12, the container 14 is inverted (FIG. 7) where the flowable product 12 enters and fills the measuring reservoir 26 through the flow ports 54 adjacent the lower surface of the upper deck 32. The product 12 within the measuring reservoir 26 is now ready for dispensing. Dispensing of the measured dose is accomplished by squeezing the container 14 to produce pressure within the container 14 (FIG. 8). Continuous pressure within the container 14 forces flowable product 12 through the pressure apertures 56 into the measuring reservoir 26 beneath the bottom wall 58 of the piston valve 28, and forces the piston valve 28 to move from the open position (FIG. 7) towards the closed position (FIG. 8), and in doing so, to dispense the measured dose of product 12 through the flow conduit 36 and out the exit orifice 34. When the piston valve 28 reaches the closed position (FIG. 9), the valve stem 60 engages the valve seat 62 on the bottom end of the flow conduit 36 to close the flow conduit 36 and complete the dispensing cycle.

The release of pressure from the container 14 (FIG. 10) allows the coil spring 30 to expand and force the piston valve 28 back towards the normal at rest position. Flowable product 12 again enters the measuring reservoir 26 through the flow ports 54 while flowable product 12 is also returned to the container 14 through the pressure apertures 56. The reverse motion of the piston valve 28 creates a "suck-back" effect at the exit orifice 34 preventing any product 12 from dripping from the exit orifice 34 after the squeezing pressure is released. Once uprighted, a small amount of product 12 will normally remain within the piston valve 28.

The amount of the measured dose and the speed of dispensing and refilling can be easily adjusted by one skilled in the art by varying the size of the measuring reservoir 26, the size of the piston valve 28, the size of the flow ports 54 and the size of the pressure apertures 56.

It can therefore be seen that the exemplary embodiment provides a dispensing closure 10 which is uniquely effective for automatically dispensing a measured dose of flowable product 12 from a squeeze-type container 14.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A dispensing closure for dispensing a flowable product from a squeeze-type product container comprising:

a closure body having an upper deck, a central exit orifice, a flow conduit in communication with said exit orifice and depending downwardly from said upper deck to provide a flow path from an entrance orifice at a lower end thereof to said exit orifice, and an inner skirt depending from said upper deck and being configured to attach to a product container;

a cup-shaped measuring reservoir having an upper peripheral edge received in engagement with a mounting rim on a lower surface of said upper deck, said mounting rim encircling said flow conduit, said measuring reservoir having a plurality of flow ports adjacent said upper peripheral edge, and further having a bottom wall, said measuring reservoir filling with a measured dose of flowable product through said flow ports when said container is inverted;

a cup-shaped piston valve having a bottom wall and a valve stem extending upwardly from said bottom wall, said piston valve being slidably movable within the measuring reservoir between an open position wherein said valve stem is spaced from a valve seat formed at said entrance orifice of said flow conduit whereby flowable product can enter said measuring reservoir through said flow ports and exit through said flow conduit, and a closed position wherein said valve stem is in mating engagement with said valve seat closing said flow conduit, said piston valve being movable from said open position to said closed position to dispense said measured dose of product responsive to pressure within said container induced by squeezing said container; and a coil spring encircling said flow conduit and said valve stem and captured between said lower surface of said upper deck and said bottom wall of said piston valve, said spring normally biasing the piston valve to said open position.

2. The dispensing closure of claim 1 further comprising a closure lid connected to said closure body by a living hinge.

3. The dispensing closure of claim 2 wherein said closure lid includes a sealing structure received in interfitting engagement with the exit orifice to selectively prevent flowable product from exiting said exit orifice.

4. The dispensing closure of claim 1 wherein said bottom wall of said piston valve includes a plurality of pressure apertures, flowable product moving through said pressure apertures when said piston valve is moving between said open and closed positions.

5. The dispensing closure of claim 2 wherein said bottom wall of said piston valve includes a plurality of pressure apertures, flowable product moving through said pressure apertures when said piston valve is moving between said open and closed positions.

6. The dispensing closure of claim 3 wherein said bottom wall of said piston valve includes a plurality of pressure apertures, flowable product moving through said pressure apertures when said piston valve is moving between said open and closed positions.

7. A dispensing closure for dispensing a flowable product from a squeeze-type product container comprising:

a closure body having an upper deck, an exit orifice, a flow conduit in communication with said exit orifice and depending downwardly from said upper deck to provide a flow path from an entrance orifice at a lower end thereof to said exit orifice, and an inner skirt depending from said upper deck and being configured to attach to a product container;

a cup-shaped measuring reservoir having an upper peripheral edge adjacent a lower surface of said upper deck, said measuring reservoir having a plurality of flow ports adjacent said upper peripheral edge, and further having a bottom wall;

a cup-shaped piston valve having a bottom wall and a valve stem extending upwardly from said bottom wall, said piston valve being slidably movable within the measuring reservoir between an open position wherein said valve stem is spaced from a valve seat formed at said entrance orifice of said flow conduit, and a closed position wherein said valve stem is in mating engagement with said valve seat closing said flow conduit, said piston valve being movable from said open position to said closed position to dispense said measured dose of product responsive to pressure within said container induced by squeezing said container; and a spring captured between said lower surface of said upper deck and said bottom wall of said piston valve, said spring normally biasing the piston valve to said open position.

8. The dispensing closure of claim 7 further comprising a closure lid connected to said closure body by a living hinge.

9. The dispensing closure of claim 8 wherein said closure lid includes a sealing structure received in interfitting engagement with the exit orifice to selectively prevent flowable product from exiting said exit orifice.

10. The dispensing closure of claim 7 wherein said bottom wall of said piston valve includes a plurality of pressure apertures, flowable moving through said pressure apertures when said piston valve is moving between said open and closed positions.

11. The dispensing closure of claim 8 wherein said bottom wall of said piston valve includes a plurality of pressure apertures, flowable product moving through said pressure apertures when said piston valve is moving between said open and closed positions.

12. The dispensing closure of claim 9 wherein said bottom wall of said piston valve includes a plurality of pressure apertures, flowable product moving through said pressure apertures when said piston valve is moving between said open and closed positions.

* * * * *